April 1, 1969   R. F. WILLIAMS, JR., ET AL   3,436,246
HEAT-SEALABLE POLYETHYLENE SHEETING HAVING THINLY ROLLED
COATING OF POLYETHYLENE ADMIXED WITH PARAFFIN
Filed May 19, 1966
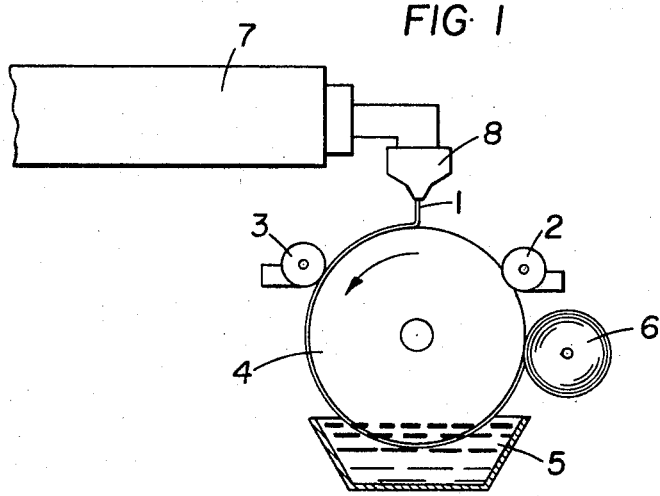
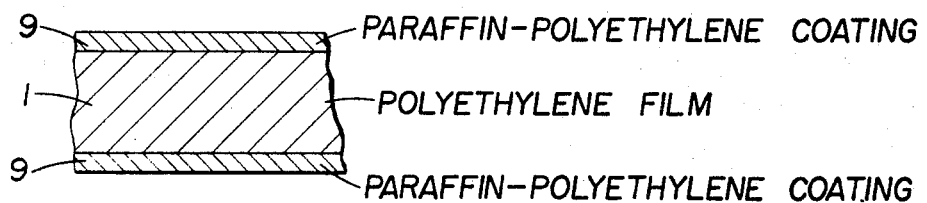
ROBERT F. WILLIAMS, JR.
KENNETH G. SURRIDGE
DAVID E. STREBE
INVENTORS
BY W. T. French
Charles L. Good
ATTORNEYS United States Patent Office 3,436,246
Patented Apr. 1, 1969

3,436,246
HEAT-SEALABLE POLYETHYLENE SHEETING HAVING THINLY ROLLED COATING OF POLYETHYLENE ADMIXED WITH PARAFFIN
Robert F. Williams, Jr., and David E. Strebe, Rochester, N.Y., and Kenneth G. Surridge, deceased, late of Rochester, N.Y.; said Williams assignor to Eastman Kodak Company, Rochester, N.Y., a corporation of New Jersey
Filed May 19, 1966, Ser. No. 600,674
(Filed under Rule 47(a) and 35 U.S.C. 116)
Int. Cl. B44d 1/24; B32b 27/08, 33/00
U.S. Cl. 117—65.2                              5 Claims

ABSTRACT OF THE DISCLOSURE

Polyolefin sheets and films having improved heat sealing characteristics and improved clarity can be made by coating them with a blend containing paraffin and polyethylene in weight ratios, respectively, of from 25:75 to 75:25, and then compression rolling the resulting coated polyolefin sheet or film. Coated sheets or films can be heat sealed (for example, with another polyolefin sheet or film) at temperatures that are at least 25° C. lower than temperatures that would be required for heat sealing in the absence of the special coating of this invention.

This application is a continuation-in-part of our earlier application entitled "Self-Lubricating Heat Sealable Polyethylene Film or Sheeting," Ser. No. 142,076, filed on Oct. 2, 1961, and now abandoned.

This invention concerns polyolefin films and sheets having improved heat-sealing characteristics.

Polyethylene has been widely used for packaging purposes in view of its inexpensiveness and durability. However, there has been some difficulty in obtaining a satisfactory seal between polyethylene surfaces due to the chemical inertness of the polyolefin itself as well as its other characteristics. For instance, when polyethylene is passed through packaging machines designed for other sheeting, such as cellophane for instance, there is a tendency for the polyethylene sheeting to stick to the heating anvil or plate and jam the machine. Efforts have been made to avoid this difficulty by using special anvils coated with non-sticking material, using a blast of hot air or the like, with various degrees of success.

Another solution to the problem of heat sealing polyethylene has been to coat the polyethylene with a coating which would adhere to the polyethylene surface, but which would melt at a lower temperature than the polyethylene film. However, polyethylene is a hydrophobic material which very often must have a special treatment, such as electron bombardment, oxidation, or the like, to obtain adhesion for subsequent coatings. This involves additional expense. Therefore, it has been desirable to obtain a relatively inexpensive coating which could be applied easily to the surface of polyethylene film which would melt at a lower temperature than the polyethylene itself yet which would provide a satisfactory seal between two polyethylene surfaces. It has been especially desirable to obtain a coating composition which could be applied without any special surface treatment of the polyethylene and which would provide a film which could be passed through packaging machinery designed for cellophane or a similar type of packaging material.

We have found a coating composition which is not only inexpensive and has good adhesion but is very thin and can be applied during the extrusion or film-forming operation without requiring a separate coating step.

One object of this invention is to provide a heat-sealable polyethylene film. Another object is to provide a method of coating polyethylene film during the extrusion or film-forming operation with a very thin heat-sealable layer. An additional object is to provide a coated polyethylene film which can be compression rolled without the use of an additional lubricant. A further object is to provide a coating composition for use on polyethylene film which, as a very thin film, will have good adhesion to the polyethylene and which will retain its adhesion when used to adhere two polyethylene surfaces to each other.

The above objects are obtained by coating one or both sides of a polyethylene sheet with a thin coating of a mixture of paraffin and at least 25% by weight of polyethylene. The coating on both sides can be obtained by extruding polyethylene onto a roller which has been previously coated with a mixture of polyethylene and paraffin and then coating on the surface of the hot extruded polyethylene a layer of paraffin and polyethylene, after which the hot coated polyethylene can be chilled by passing into a chill bath or onto a chill roll. A very thin coating is transferred from the drum to the polyethylene surface. This coating is difficult to measure but is of the magnitude of 5–100 microns in thickness. The coating placed on the top of the extruded polyethylene is of the same thickness range, although it may be slightly thicker than that coated on the drum side due to different coating means such as when using a hopper, spreader bar, kiss roll, etc.

FIG. 1 in the attached drawing illustrates one embodiment of the process of our invention.

Polyethylene 1 is extruded from the extruder 7 through die 8 onto roll 4. Roll 2 coats a mixture of polyethylene and paraffin onto roll 4 previous to coating the polyethylene 1 onto the roll so that the polyethylene 1 is being coated onto a thin film of polyethylene mixed with paraffin. A mixture of polyethylene and paraffin mixture is coated by means of roll 3 onto the surface of the extruded polyethylene 1. Following the coating by roll 3, the film is immersed in a quenching bath 5, prior to being removed from roll 4 onto wind-up 6.

FIG. 2 in the attached drawing shows a sectional view of a polyethylene sheeting having coated on both sides a thin layer 9 of a mixture of paraffin and at least 25% polyethylene.

Although polyethylene is our preferred embodiment, we can use other polyolefins, such as polypropylene, various polyolefin blends, olefin copolymers, and the like, provided the polyolefin is a poly-α-olefin having 2-10 carbon atoms and the polyolefin in the coating is derived from the same olefin as the polyolefin substrate but differs in density and/or molecular weight.

The optimum concentration of polyolefin in the polyolefin-paraffin mixture is related to the melt index, molecular weight, density, melt viscosity and side chain branching of the polyolefin. The optimum ratio of paraffin to the various polyolefins can be approximated by melt viscosity. For instance, mixtures of paraffin and polyolefins having melt viscosities of 1,000 to 25,000 cps. at 140° C. (284° F.) appear to be the most satisfactory for overall performances. Mixtures having melt viscosities less than 1,000 cps. at 140° C. usually fail to provide satisfactory heat seals, and those having melt viscosities greater than 25,000 cps. are extremely difficult to deposit at controlled thicknesses of less than 0.5 mil and tend to tack to the surfaces of the compression rolls and/or hot metal during heat sealing.

The polyethylene-paraffin mixture preferably contains at least 50% by weight of polyethylene but may contain much more depending on the above-described factors.

When other poly-α-olefins are substituted, the same relationship holds true and at least 50% of the coating mixture is most advantageously at least one of the poly-α-olefins.

The following examples are intended to illustrate our invention but are not intended to limit it in any way:

Example 1

Polyethylene resins were extruded and coated using the apparatus described in the attached drawing with the following results:

| Sample No. | Composition of wax coating | Surface temp. of rolls, °F. | | | Quench bath | Film haze | Heat seal temp., °F. | Haze in heat sealed area |
|---|---|---|---|---|---|---|---|---|
| | | Roll 2 | Roll 3 | Roll 4 | | | | |
| 1 | None | (¹) | (¹) | 150 | None | High | 245 | High. |
| 2 | 100% paraffin | 150 | 150 | 135 | do | do | 245 | Do. |
| 3 | 75% paraffin, 25% polyethylene | 190 | 190 | 175 | do | do | 215 | Do. |
| 4 | 50% paraffin, 50% polyethylene | 215 | 215 | 165 | do | do | 215 | Do. |
| 5 | 25% paraffin, 75% polyethylene | 235 | 235 | 200 | 70° F. H₂O | do | 215 | Do. |
| 6 | 100% polyethylene | | | | Too viscous to melt coat with this assembly | | | |

¹ Not in contact.

The polyethylene resins extruded in this series had a melt index of 0.7 and a gradient density of 0.961 gram/cc. The polyethylene in the paraffin blends had a melt index of 200, average molecular weight of 10,000, and gradient density of 0.910.

Example 2

A polyethylene strip having a melt index of 0.7 and gradient density of 0.961 gram/cc. was compressed 360% in a single pass at 7 ft./min. with the rolls heated to 210° F. and the strip lubricated with an .03% Aerosol OT/H₂O solution. Maintaining the roll setting, roll temperature and roll speed constant, the following results were obtained (cf. Williams U.S. Patent No. 3,194,836):

| Sample No. | Strip coating | Lubricant | Percent compression | Haze | Heat seal temp., °F. |
|---|---|---|---|---|---|
| 1A | None | None | 161 | Yes | 245 |
| 1B | do | .03% Aerosol OT | 360 | Nil | 245 |
| 2A | Paraffin | None | 360 | Nil | 245 |
| 2B | do | .03% Aerosol OT | 386 | Nil | 245 |
| 3A | 75% paraffin/25% polyethylene | None | 488 | Nil | 215 |
| 3B | do | .03% Aerosol OT | 616 | Nil | 215 |
| 4A | 50% paraffin/50% polyethylene | None | 425 | Nil | 215 |
| 4B | do | .03% Aerosol OT | 479 | Nil | 215 |
| 5A | 25% paraffin/75% polyethylene | None | 480 | Nil | 215 |
| 5B | do | .03% Aerosol OT | 579 | Nil | 215 |

The polyethylene used in above examples in the paraffin mixture had a melt index of 200 and average molecular weight of 10,000.

Haze ratings of nil indicate films of 1 mil gauge have less than 3% total haze.

Heat seal temperatures indicate the minimum temperatures at which a heat seal could be obtained. All heat seals were made with the heated metal in direct contact with the film surfaces except samples 1A, 1B, 2A, and 2B. Strengths of the heat seals in the above table increased as the percent of polyethylene in the surface coatings increased. To obtain a heat seal on the uncoated films and the films coated with 100% paraffin, it was necessary to follow the conventional procedure for heat sealing polyethylene films since the film tacks to the heated metal at the temperatures required for sealing.

Other wax-like materials may be added to the polyethylene-paraffin mixture. These materials include the microcrystalline waxes, terpene resins, such as the piccolyte resin, or the like. The basic requirement solved by this invention is that the polyethylene-wax mixture adheres with greater force to the polyolefin films at elevated temperatures than to heated metal surfaces.

The coated polyolefin film can be quenched by passing it into cold water or else onto a chilled cold roll so that the polymer is solidified and cooled during contact with the support to a temperature of at least 100° F. below its frost line temperature within at least 60 seconds from the time it leaves the extruder.

As is described above, this invention provides a new and unexpectedly useful composite sheet suitable for use as a heat-sealable packaging material and characterized by having substantially no haze comprising a polyethylene substrate and a well-bonded coating having a thickness from about 5 to about 100 microns of a polyethylene and paraffin mixture on at least one surface of the substrate, said mixture being characterized by having a viscosity at 284° F. from about 1,000 to about 25,000 cps. and further characterized in that said composite sheet can be heat sealed when the well bonded coating surfaces are brought into contact at a temperature at least 25° below that which would be required in the absence of the coating.

This invention also unexpectedly provides a new and useful spliced film as described above comprising two edges of at least one heat-sealable composite sheet as described above in which said edges mutually adhere by means of adhesive contact between said well-bonded coatings.

The splicing operation can be performed at a temperature as low as 215° F. as shown in the above table, this being unexpectedly low for such advantageous results.

The invention has been described in detail with particular reference to preferred embodiments thereof, but it will be understood that variations and modifications can be effected without departing from the spirit and scope of the invention as described hereinabove and as defined in the appended claims.

We claim:
1. A composite, compression rolled sheet suitable for use as a heat-sealable packaging material and characterized by having substantially no haze comprising a polyethylene substrate and a well-bonded coating having a thickness from about 5 to about 100 microns of a polyethylene and paraffin mixture on at least one surface of the substrate, said mixture containing said polyethylene and said paraffin in a weight ratio, respectively, of from about 5:75 to about 75:25 and said mixture being characterized by having a viscosity at 284° F. from about 1,000 to about 25,000 cps. and further characterized in that said composite sheet can be heat sealed when the well-bonded coating surfaces are brought into contact at a temperature at least 25° F. below that which would be required in the absence of the coating.

2. A composite sheet as defined by claim 1 in which said mixture consists essentially of from about 25% to about 75% by weight of paraffin with the remainder being polyethylene.

3. A composite sheet as defined by claim 1 wherein said well-bonded coating is on both surfaces of the substrate.

4. A composite sheet as defined by claim 2 in which the polyethylene of said mixture has a melt index of about 200, an average molecular weight of about 10,000 and a gradient density of about 0.91.

5. A composite sheet as defined by claim 4 wherein said well-bonded coating is on both surfaces of the substrate.

References Cited

UNITED STATES PATENTS

| | | | |
|---|---|---|---|
| 2,219,700 | 10/1940 | Perrin et al. | 260—94 |
| 2,499,756 | 3/1950 | Jacobson | 260—33.6 |
| 2,523,705 | 9/1950 | Lovell et al. | 260—28.5 |
| 2,551,966 | 5/1951 | Pierce | 18—1 |
| 2,706,719 | 4/1955 | Newberg et al. | 260—28.5 |
| 2,754,278 | 7/1956 | Wilson et al. | 260—28.5 |
| 2,773,045 | 12/1956 | Simeri et al. | 260—28.5 |
| 2,842,508 | 7/1958 | Sterk | 260—28.5 |
| 2,857,352 | 10/1958 | Etherington et al. | 260—28.5 |
| 2,956,671 | 10/1960 | Cornwell | 206—46 |
| 3,041,208 | 6/1962 | Hay et al. | 117—138.8 |
| 3,083,410 | 4/1963 | McGlamery | 18—48 |
| 3,088,844 | 5/1963 | Hungerford et al. | 117—47 |

WILLIAM D. MARTIN, *Primary Examiner.*

B. PIANALTO, *Assistant Examiner.*

U.S. Cl. X.R.

117—122, 138.8, 161, 68.5